United States Patent [19]

Mortensen

[11] 4,034,361

[45] July 5, 1977

[54] METHOD AND APPARATUS FOR STORING BIOLOGICAL MATTER

[76] Inventor: Thomas L. Mortensen, 5742 Falk Court, Arvada, Colo. 80002

[22] Filed: July 28, 1975

[21] Appl. No.: 599,648

[52] U.S. Cl. .................................. 340/272; 177/7; 177/46; 340/280; 340/371; 340/421

[51] Int. Cl.² ......................................... G08B 21/00

[58] Field of Search .............. 340/272, 244 R, 371, 340/280, 421, 266; 177/48, 45, 46, 47, 7, 1; 73/296

[56] References Cited

UNITED STATES PATENTS

| | | | |
|---|---|---|---|
| 1,552,939 | 9/1925 | Mackey | 177/47 |
| 1,766,788 | 6/1930 | MacMahon | 177/45 |
| 2,663,005 | 12/1953 | Obermaier | 340/266 |
| 2,670,194 | 2/1954 | Hansson | 177/45 |
| 3,131,780 | 5/1964 | Yarborough | 177/46 |
| 3,200,389 | 8/1965 | Damico et al. | 340/244 R |
| 3,412,395 | 11/1968 | Kiene, Jr. | 340/421 |
| 3,656,138 | 4/1972 | Hamma | 177/48 |
| 3,740,740 | 6/1973 | Milo | 340/244 R |
| 3,755,801 | 8/1973 | Milo | 340/244 R |

*Primary Examiner*—Glen R. Swann, III
*Attorney, Agent, or Firm*—John E. Reilly

[57] ABSTRACT

The supply of cryogenic fluid used for controlled storage environment of biological materials is monitored so as to insure an adequate level. The monitoring is effected by employing a beam balance mechanism. Counterweights associated with the beam balance are adjusted for providing a balance arm transition around a horizontal axis when the total weight of the container including the biological materials and the cryogenic refrigerant has dropped below a predetermined threshold. A sensing switch associated with the arm of the beam balance actuates an alarm circuit when the weight threshold has been passed.

10 Claims, 4 Drawing Figures

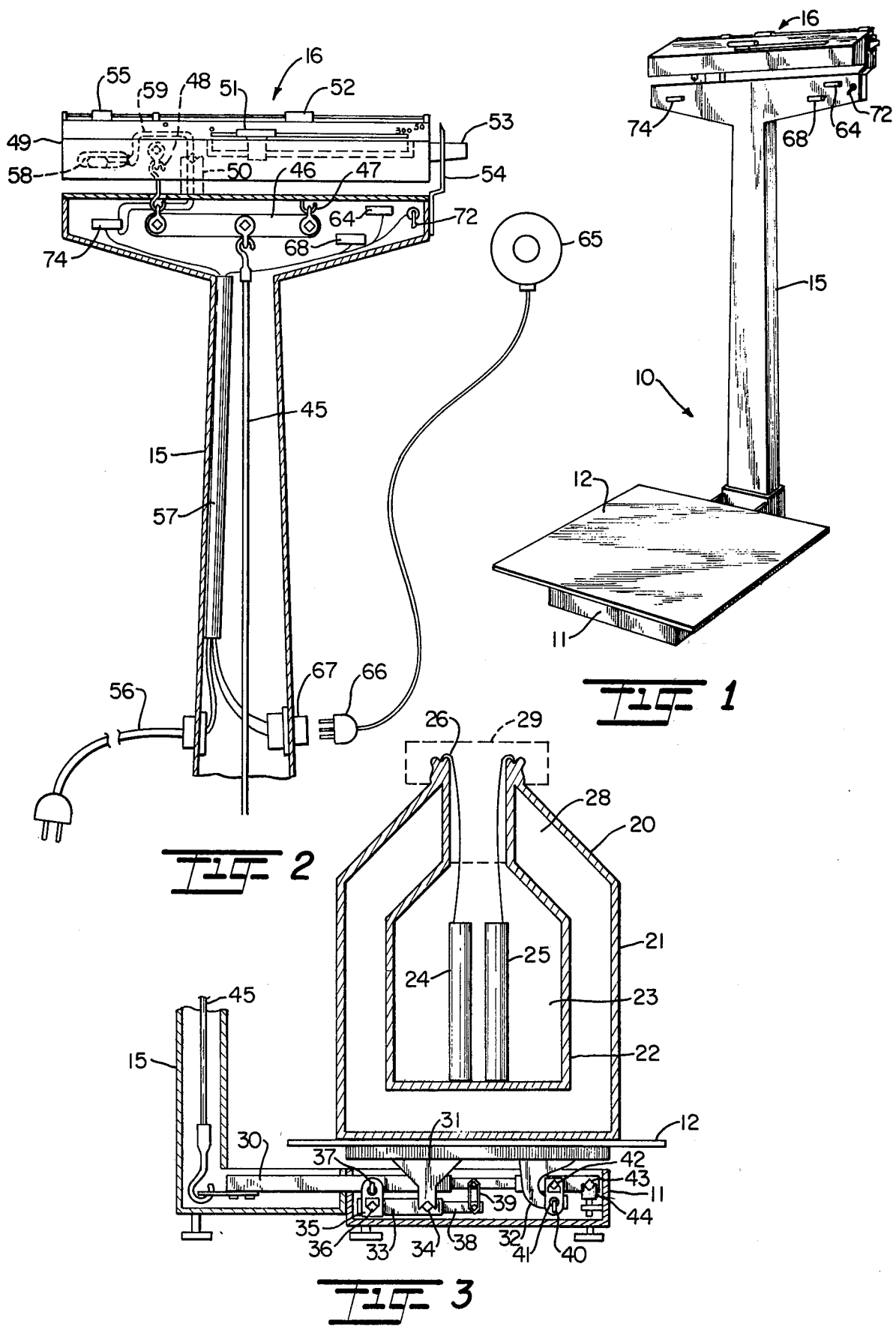

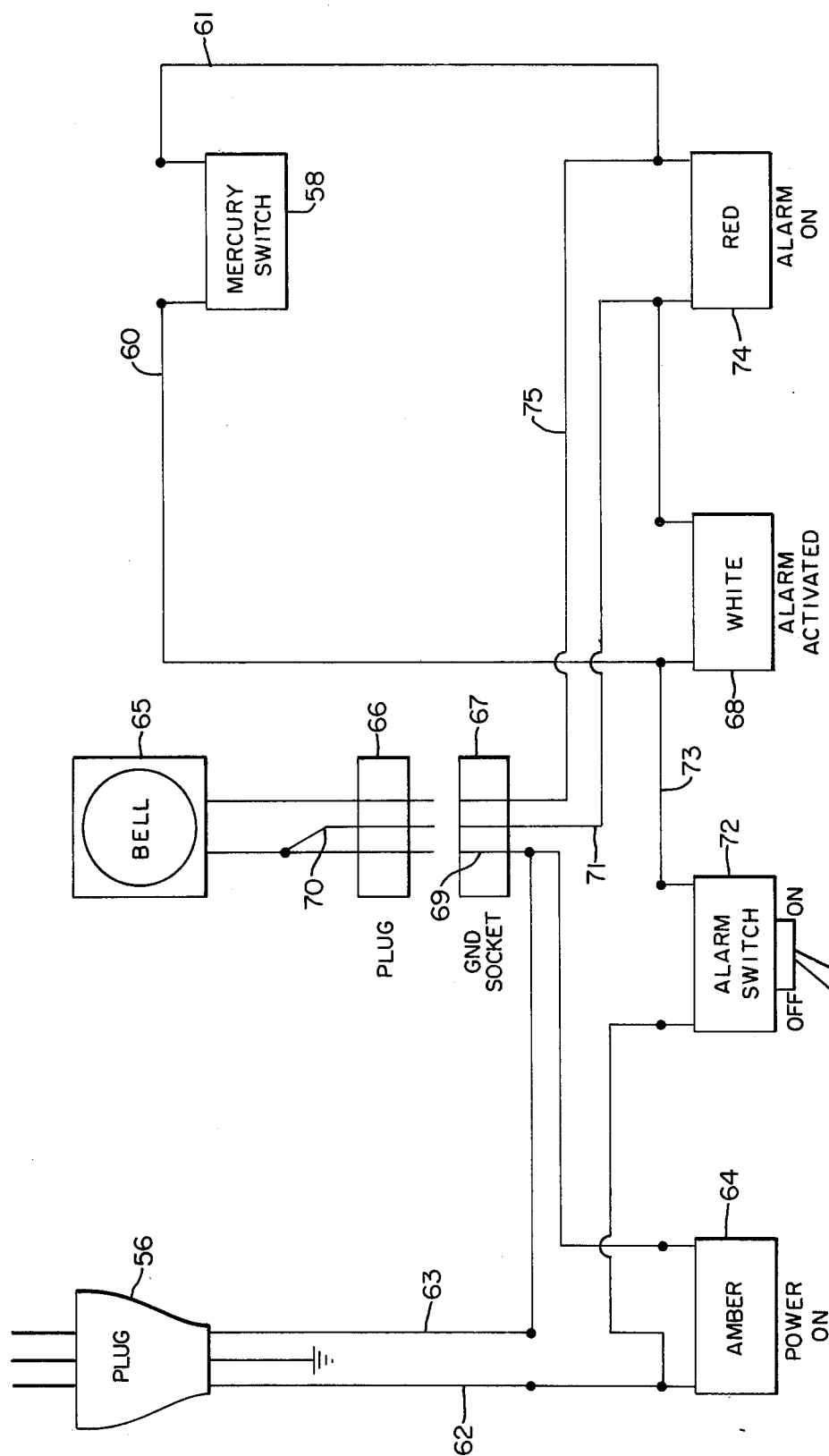

METHOD AND APPARATUS FOR STORING BIOLOGICAL MATTER

BACKGROUND OF THE INVENTION

This invention relates to methods and apparatus for monitoring the integrity of the environment associated with stored biological materials. More particularly, the present invention relates to a novel and improved method and apparatus for detecting that the supply of cryogenic fluid used in super-cooled storage of biological materials has not dropped below a predetermined amount. The invention is particularly useful for activating a detectable alarm whenever the supply of cryogenic fluid which generates a supercooled environment for biological materials has been reduced to a level which requires attention.

It has been known for some time that various biological materials can be stored in a supercooled environment and subsequently revived for future use without significant damage. Liquid nitrogen is a particularly popular refrigerant used in storage containers for such biological materials to maintain the temperature at about −320° F. Liquid nitrogen is especially attractive for such applications because of its relatively inert gaseous qualities but, as with any cryogenic fluid, it will evaporate from a container at varying rates depending upon the type of container used. These containers are presently used extensively in the farm and ranch community for preservation of animal semen for use in artificial insemination. In addition, hospitals and medical research centers are employing cryogenic storage containers for many biological items such as tissue cultures, eye corneas, blood, human semen and the like. The monetary value of such biological materials is high and in many cases the materials are difficult to replace or even irreplaceable.

A variety of biological containers using high vacuum design have been developed. Upon loss of the vacuum or thermal insulation qualities, the length of retention time for the cryogenic fluids changes drastically such as from days or weeks to a matter of hours or even minutes. Complete evaporation loss of the liquid nitrogen from the container so that the biological materials are warmed even to an approach of ambient temperature can render the materials useless. This loss is further aggravated where containers must be transported via vehicles of various sorts and thus exposed to potential handling damage. Still further, the degradation of the thermal insulation qualities of the container is frequently difficult to detect and not noticeable until the refrigerant loss has progressed beyond the point of recovery.

The use of devices for detecting liquid level in accordance with the prior art such as dip-stick probes, static head weight pressure gauges, and the like require special and frequent attention as well as hazarding additional potential refrigerant loss. It has been known to monitor the contents of a container by inspection of the weight changes. For instance, U.S. Pat. Nos. 1,552,939 by Mackey and 3,656,138 by Hamma show spring biased scale arrangements with appropriately positioned electrical contacts associated with the spring scale pointers for closing an electrical alarm circuit. Unfortunately, spring scale devices are limited in their range of application and unreliable for many uses. Thus there has been a continuing need for a refrigerant monitoring system which can accommodate a wide variety of different containers and weight ranges in a reliable and accurate manner while providing an alarm whenever a preselected threshold level has been passed.

SUMMARY OF THE INVENTION

The method and apparatus in accordance with this invention makes it possible to select an accurate weight threshold for monitoring the amount of refrigerant within a container for storing biological material. The range of weight variation accommodation is obtained by advantageously utilizing the principle of a balance beam scale. The container with its refrigerant and biological materials are placed so as to cause the balance arm of the scale assembly to assume a first orientation relative to a reference line or plane (usually horizontal) and the counterweights of the scale are placed at a level wherein the amount of weight loss from evaporation will require attention. As the cryogenic refrigerant evaporates, the scale beam arm will change its balance position relative to the reference line or plane and a switch then senses this change so as to actuate an alarm circuit. The switch can be a mercury contact switch directly attached to the beam arm so that shifting of the arm about its transverse horizontal axis as a result of the weight change causes contact closure and actuation of a visible and/or audible alarm.

An object of this invention is to provide a novel and improved method and apparatus for sensing that the weight change associated with a storage container has passed a critical threshold level.

Another object of this invention is to provide a method and apparatus for monitoring the level of cryogenic fluid associated with a biological material storage container so as to provide a warning that the fluid level has passed a point which indicates that it requires attention.

A further object of this invention is to provide a method and apparatus for indicating that the cryogenic fluids used for generating a supercooled environment within a biological material storage container has reached a preselected depletion point.

A still further object of this invention is to provide a method and apparatus for monitoring the effective weight of cryogenic materials used to generate a controlled supercooled environment within a biological material container.

The foregoing and other objects, features, and advantages of the present invention will be apparent in view of the following description of an exemplary preferred embodiment.

BRIEF DESCRIPTION OF THE DRAWINGS

FIG. 1 is a perspective view of a balance beam arrangement useful in conjunction with the present invention.

FIG. 2 is a partially sectioned view of the upper portion of the balance beam mechanism of FIG. 1 and particularly showing various elements associated with the preferred embodiment.

FIG. 3 is a partially sectioned view of the lower mechanical linkages employed in the FIG. 1 balance beam configuration and further showing its association with a cryogenic biological material storage container; and FIG. 4 is a schematic diagram of the circuitry associated with an alarm system in accordance with the preferred embodiment.

DETAILED DESCRIPTION OF THE PREFERRED EMBODIMENT

A general perspective view of a balance beam scale 10 incorporating the present invention is shown in FIG. 1. Scale 10 includes a stationary lower base frame 11 from which platform 12 is suspended as will be discussed below in greater detail in FIG. 3. The weight placed upon platform 12 is transmitted through pedestal 15 to a beam balance apparatus 16 on the upper portion thereof.

A typical vacuum insulated container 20 is shown in section in FIG. 3 resting upon the platform 12. A typical such container has a metallic outer skin 21 and an inner metallic chamber defining wall 22. That is, inner wall 22 forms a chamber 23 which is typically filled with liquid nitrogen. Biological material storage canisters such as 24 and 25 are arranged to be held so as to be exposed to the supercooled nitrogen environment within chamber 23 and are accessible through the neck via rods such as 26. The space 28 between walls 21 and 22 is typically filled with insulating material which can be further retained within a vacuum environment to increase the thermal insolation of inner chamber 23. A removable sealing cap 29 typically encloses the neck of container 20 and completes the thermal isolation of chamber 23.

Containers such as 20 are available in a variety of configurations other than that specifically shown, a typical source being the Cryenco Division of Cryogenic Technology, Inc. in Denver, Colorado. A typical container such as 20 is constructed of a stainless steel outer shell 21, an inner shell of aluminum and multi-layered superinsulation in a vacuum environment for the spacing 28 between inner and outer shells 21 and 22. Such containers have been developed to an extremely high holding efficiency which is frequently measured in months and are also available in various weight ranges depending upon the capacity and models selected. The thermal isolation efficiency of such containers means that they normally require infrequent attention to insure that the level of liquid nitrogen within the inner chamber 23 is adequate. However, any loss of vacuum insulation or thermal isolation from handling or rupture of the shell as well as losses from frequent access to the container can reduce the liquid nitrogen level to an inadequate point with disturbing rapidity. As will be described below, the method and apparatus of the present invention makes it possible to forewarn whenever the liquid nitrogen level has reached some preselected threshold regardless of the time required to attain this level.

In accordance with the present invention, container 20 with the biological material stored in canisters 24 and 25 and a liquid nitrogen supply within inner chamber 23 is placed on platform 12. The floating suspension associated with platform 12 is conventional in accordance with typical balance beam scale practice but will be briefly described here for purposes of background. The main purpose of such suspension within base frame 11 is to permit lateral horizontal motion of the platform 12 while transferring the weight to beam 30 for ultimate transferral to the balance arm apparatus shown in greater detail in FIG. 2. The weight on platform 12 is transferred downwardly via four spaced arms, two of which [31 and 32] are shown in the section view of FIG. 3. The two arms on the left in FIG. 3 are coupled to a beam 33 via bearing rod 34. Beam 33 is suspended by plate 35 through bearing beam 36 with plate 35 being ultimately held by a hook 37 which is rigidly attached to the side of base frame 11. It should be understood that equivalent suspension apparatus is included for the other side of the platform and the suspension arm equivalent to 31. The arm assembly 33 has an extension 38 rigidly attached thereto which is suspended from beam 30 by a pair of ring-like clips, one of which is shown at 39.

The other pair of side arms or suspension arms such as 32 are hooked over an elongated cross bar 40 (shown in end view in FIG. 3) which is hooked into a pair of suspension plates such as 41 which is further suspended by a bearing rod such as 42 to beam 30. The end of beam 30 is suspended via bearing rod 43 to a bracket 44 which is rigidly attached to base frame 11. Accordingly, the entire assembly permits relatively stable horizontal positioning of platform 12 while accommodating lateral movement thereof and still transferring the weight present on platform 12 to beam 30.

Ultimately the downward pressure from platform 21 which is transferred to beam 30 is further transferred to vertical rod 45 and mechanically coupled into the balance head 16 via pedestal 15 as can be more clearly seen in FIG. 2. Rod 45 is hooked into suspension bar 46 which is pivotally suspended from hook 47 at one end, hook 47 being rigidly attached to the frame of pedestal 15. Lever arm 46 is coupled via hook linkage 48 to the balance beam 49. Balance 49 is pivotally suspended from bracket 50 and includes a large poise counterweight 51 and a smaller poise counterweight 52 to permit balancing of the scale as indicated by extension bar 53 in the well known manner. That is, when the beam tip indicator bar 53 is positioned upwardly within trig loop side bracket 54, the positions of counterweights 51 and 52 are known to be inadequate to reflect the weight present on platform 12 whereas the positioning of indicator bar 53 downwardly within the slot of bracket 54 indicates the inverse situation. The scale further includes an additional counterweight 55 which is employed for zeroing the indicator bar 53 when no load is present on platform 12 as is likewise well known.

An electrical power source for the alarm system is provided by cable 56 which is passed through guiding conduit 57 retained along the inner side wall of pedestal 15 so as to insure that none of the electrical connections interfere in any manner with the weight transmitting rod 45. Cable 56 can be directly connected to 110 volts AC or can be coupled to a lower or other voltage source. Further, it is preferable that the voltage source be relatively low for safety reasons and thus a stepdown transformer might be included at the input for cable 56 for pedestal 15 if a low voltage is not immediately available. In any event, the voltage from cable 56 is ultimately employed to be coupled into a mercury switch 58 which is attached to one end of balance beam 49 as shown. The interconnecting wires 60 and 61 for mercury switch 58 are shown generally in FIG. 2 at 59 and are arranged so as to pass from balance beam 49 to the pedestal frame 15 via passage in proximity to the pivot point of balance beam 49 associated with bracket 50 as illustrated in FIG. 2. It will be appreciated from the description of FIG. 4 that any suitable switch can be used for mercury switch 58 such as a microswitch or the like. However, the mercury switch is preferable in that it minimizes any adverse loading on balance beam 49 and thus insures accuracy of the scale settings. Additionally, the mounting of mercury switch 58 as close as possible to the pivot point relative to bracket 50 will further minimize the amount of zero adjustment via weight 55 needed to accommodate mercury switch 58. Still further, arrangement of the connecting wires 59 so as to pass from beam 49 into the main frame of the pedestal 15 in proximity to the bearing pivot point associated with bracket 50 will minimize flexure of these wires as beam 49 pivots and thereby prevent undesired load forces from being applied to balance beam 49.

As best seen in the wiring diagram of FIG. 4, the power source from grounded cable 56 is introduced to the alarm system via leads 62 and 63. Accordingly amber lamp 64 is continuously activated at all times that power is present on leads 62 and 63. An audible alarm such as bell 65 is coupled via plug 66 and receiving socket 67 so as to insure that the alarm system is not indicated as being active via lamp 68 unless bell 65 is connected in circuit. That is, power from source 56 on pin 69 of socket 67 is coupled via jumper 70 into lead 71 of socket 67. Thus, with the alarm switch 72 closed so that a connection from lead 73 back to lead 62 is established, the presence of jumper 70 and the connection between plug 66 and socket 67 places actuating power on line 71 and energizes the white "alarm activated" lamp 68. The presence of power on lines 71 and 73 further enables the alarm circuit which includes mercury switch 58 via lead 60 and the alarm on indicator lamp 74 via lead 61. Closure of mercury switch 58 transfers power from lead 73 to lead 75 thereby actuating both lamp 74 and bell 65.

In operation, the vacuum insulated container 20 which has biological matter stored within canisters 24 and 25 is placed upon platform 12. The counterweights 51 and 52 are appropriately positioned to balance the beam 49 at the correct weight of the container including its liquid nitrogen and biological material contents. The amount of weight needed to equal the amount of nitrogen that can be safely lost is then effectively substracted from the positions of counterweights 51 and 52 to establish the threshold at which the alarm system will be actuated. The evaporation of liquid nitrogen so that this threshold weight level is obtained causes the indicator bar 53 of balance beam 49 to move vertically downward from the upward orientation above a neutral horizontal plane through the suspension point at bracket 50 resulting from the weight subtraction associated with the positioning of counterweights 51 and 52 to a downward orientation below said neutral horizontal plane. The vertical motion is sensed by the mercury contact switch 58 which closes thereby energizing both the audible alarm 65 and the visible display 74. Note that actuation of switch 58 can be employed for energizing any suitable alarm system including remotely positioned bells, flashing lights, telephone connections or even provide an input to a computer type of sensing system.

If the weight of container 20 when empty is not known, it can be placed on the platform 12 without contents and its weight measured by poises 51 and 52. Chamber 23 is then filled with liquid nitrogen and the total weight measured by the scale. Finally, the charged canisters are placed in chamber 23 and the total weight once again measured. The weight of an acceptable refrigerant loss is subtracted from the final weight and the result is used to determine the threshold positioning of counterweights 51 and 52.

Frequently the weight of stored biological materials will be insignificant and no special steps are required to compensate for its removal. In fact, the initial setting of counterweights 51 and 52 can be such as to accommodate potential weight changes from adding or removing canisters and/or biological materials. However, recalibration to compensate for weight changes from addition or removal of canisters and/or biological materials is easily effected in accordance with the present invention. For instance, the weight of the materials added or deleted can be measured on a separate scale and the settings of counterweights 51 and 52 adjusted up or down by a like increment. Of course scale 10 can be used for this same purpose such as by noting the settings of counterweights 51 and 52, measuring the weight differential of the container 20 before and after adding or removing canisters and/or materials, and resetting counterweights 51 and 52 by an amount and direction in accordance with the aforementioned weight differential.

A significant advantage of the present invention is that it does not rely upon spring balancing but relies upon the leverage ratio accuracy of beam balances for linearity over a wide range of weights and also reliable long term operation. Spring type scales suffer from the reduced available range and also loss of linearity over a long period of time. Panel light 64 indicates that power is present for the system and is energized at all times that a power source is coupled to cable 56. The alarm actuator lamp 68 is primarily to provide an indication that the on-off switch 72 is appropriately set. It is generally preferable that the alarm system be deactivated via switch 72 while the scale is being set and also while work is being performed in conjunction with the container. However note that the alarm system will function as intended regardless of whether any of the indicator lamps have burned out. The balance beam scale alarm as shown and described will not interfere with normal performance of the container, will not induce additional heat relative to the container and will sound an alarm due to excessive nitrogen evaporation or reduced nitrogen fluid level to serve as a reminder for refilling. Switch 72 can be state of the art momentary off switch or can be a time-out switch which can only be left open for a selected period of time, both of which are readily available in the state of the art. Such momentary off or time-out switches can insure that the alarm system will not be inadvertently left deactivated after working with the scale and/or container.

A typical vacuum container might weigh about 80 pounds fully loaded with 25 liters of liquid nitrogen and have an empty weight of 36 pounds. Since it is known that a liter of liquid nitrogen weighs 1.8 pounds [0.8 kg], the 25 liters of liquid nitrogen weigh 44.6 pounds [20.2 kg]. In accordance with the present invention, such a container is placed on the scale platform with its contents and the scale should be balanced at around 80 pounds. Of course there may be some additional weight from the biological material in the canisters which means that the scale will balance so that the weight beam tip 53 will not center within the trig loop 54. However the appropriate settings of large increment poise counterweight 51 and vernier poise counterweight 52 can be positioned to determine what the actual weight is. Assuming that the container and contents with full charge of liquid nitrogen is 80 pounds, the counterweights 51 and 52 might typically then be set at 40 pounds which represents a loss of all but 4.6 pounds of liquid nitrogen. The setting of counterweights 51 and 52 as mentioned results in the weight beam tip 53 rising above the horizontal plane through the suspension point at bracket 50 and remaining in this position until 40 pounds or more of liquid nitrogen has evaporated. The tip 53 at that point will move from above the horizontal plane to a position below that horizontal plane thereby effecting switching of mercury switch 58 and actuation of the alarm system. For many applications, it is sufficient that large poise 51 be positionable between graduations representing 50 pound increments and can be set between 0 and 300 pounds. The small poise counterweight usually can be positioned in graduations between 0 and 50 pounds in such a typical configuration. This would mean that the foregoing example would be effected by placing the large poise 51 on 0 and the small poise 52 on 40. Note that the function of the mercury switch 58 could be performed by employing contacts on the lower inner edge of the trig loop 54 so that they are shorted by a bar of electrically conductive material on the tip 53 of balance beam 49. Other locations of the switch can be included if desired, even associated with elements such as transmission rod 45, beam 30 or the like and other types of switches such as microswitches, photocells and the like can be used. In fact, replacement of mercury switch 58 with a light source and photocell appropriately mounted to the base frame of pedestal 15 so that the light path therebetween is interrupted by movement of balance arm 49 is particularly attractive since such an arrangement would not impair the normal mechanical operation of scale 10. However the photocell would require additional circuit complexity which is avoided by the use of a mercury switch.

Although the present invention has been described with particularity relative to the foregoing exemplary preferred embodiment, various modifications, additions, changes and applications thereof other than those specifically mentioned herein will be readily apparent to those having normal skill in the art without departing from the spirit of this invention.

What is claimed is:

1. In apparatus for sensing weight loss of a cryogenic fluid employed as a coolant in a biological storage container wherein there is provided a balance assembly including a fixed frame, a balance beam pivotally mounted on said fixed frame and movable between a first location on one side of a reference plane and a second location on an opposite side of said reference plane, the combination therewith of:

means including a receiving platform responsive to the weight of the container and its contents to urge said beam into said first location when the weight of the container and its contents is at or above a predetermined level and counterweight means for urging said beam into said second location in response to a predetermined weight loss of the container and its contents such that the total weight is reduced below the predetermined level, an electric alarm circuit which is connectable to an electric power source, including terminal means for electrically connecting a remote alarm into said alarm circuit and alarm monitoring means for monitoring effective electrical connection of a remote alarm into said alarm circuit, and sensing means in said alarm circuit responsive to movement of said beam to said second location indicating a weight reduction of the container and its contents below the predetermined level for energizing said alarm circuit.

2. Apparatus in accordance with claim 1 wherein said sensing means includes switch means for electrically enabling said alarm circuit.

3. Apparatus in accordance with claim 2 wherein said switch means is a gravity actuated mercury contact switch attached to said beam for providing a closed electrical circuit whenever said beam is in said second location and an open electrical circuit whenever said beam is in said first location.

4. Apparatus in accordance with claim 3, including a remote audible alarm detachably connected into said alarm circuit, and wherein said alarm circuit includes a visible alarm connected in parallel with said remote alarm, and said mercury switch when closed completes the electric circuits of both said audible and visible alarms.

5. Apparatus in accordance with claim 4 wherein said balance beam is pivoted about a transverse horizontal axis, said mercury switch being interconnected with said alarm circuit by leads passing from said beam to said fixed frame in proximity to said pivot axis of said balance beam.

6. Apparatus in accordance with claim 4 wherein said alarm circuit further includes power source monitoring means for monitoring the presence of electrical potential from said power source, and a manually operable switch in series circuit relation between said power source and the elements of said alarm circuit other than said power source monitoring means.

7. Apparatus in accordance with claim 6 wherein said audible alarm is coupled in said alarm circuit by a detachable connector including means for electrically disabling said alarm monitoring means and said visible alarm whenever said audible alarm is disconnected from said connector.

8. The method of indicating that the amount of cryogenic liquid coolant in a container for storing biological material is below a predetermined level using a balance beam scale which has a platform and a beam arm with adjustable poise counterweights and indicia translating the position of said poise counterweights on said beam arm into weight designation wherein said beam arm is movable between at least two vertically displaced positions as a result of weight change on the platform, comprising the steps of:

placing the container with its contents on said platform of the balance beam scale, adjusting said poise counterweights of the balance beam scale to a point representing a weight equivalent to the weight of the container and its contents less the weight of an acceptable amount of lost cryogenic liquid coolant, detecting a predetermined amount of loss of liquid coolant by detecting a corresponding transition of the balance beam arm between the vertically displaced positions, and enabling an alarm system in response to the vertical transition detection.

9. The method in accordance with claim 8 wherein said detecting step includes the step of closing an electrical switch, and said enabling step includes the step of applying electrical power to the alarm system in response to closure of said electrical switch.

10. The method in accordance with claim 9 wherein said enabling step further includes the step of applying electrical power concurrently to a visible alarm on the balance beam scale and to a remote audible alarm.

* * * * *